United States Patent
Suzuki (10) Patent No.: US 11,175,864 B2
(45) Date of Patent: Nov. 16, 2021

(54) IMAGE FORMING APPARATUS AND METHOD FOR DISPLAYING IMAGE

(71) Applicant: Taito Suzuki, Kanagawa (JP)

(72) Inventor: Taito Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/037,700

(22) Filed: Sep. 30, 2020

(65) Prior Publication Data

US 2021/0149606 A1 May 20, 2021

(30) Foreign Application Priority Data

Nov. 15, 2019 (JP) .............................. JP2019-207233

(51) Int. Cl.
*G06F 3/12* (2006.01)
*H04N 1/00* (2006.01)

(52) U.S. Cl.
CPC .......... *G06F 3/1208* (2013.01); *G06F 3/1256* (2013.01); *H04N 1/0044* (2013.01); *H04N 1/00466* (2013.01); *H04N 1/00639* (2013.01); *H04N 2201/3242* (2013.01)

(58) Field of Classification Search
CPC ... G06F 3/1208; G06F 3/1256; H04N 1/0044; H04N 1/00639; H04N 1/00466; H04N 2201/3242
See application file for complete search history.

(56) References Cited

U.S. PATENT DOCUMENTS

| 9,016,680 B2* | 4/2015 | Mutsuno | B42B 4/00 270/58.09 |
|---|---|---|---|
| 2012/0162202 A1* | 6/2012 | Rolleston | G06F 3/1208 345/419 |
| 2013/0033724 A1* | 2/2013 | Nonaka | G03G 15/5029 358/1.15 |
| 2014/0240740 A1* | 8/2014 | Salgado | G06F 3/1256 358/1.13 |
| 2016/0165091 A1* | 6/2016 | Ooba | H04N 1/0032 358/1.15 |
| 2017/0094083 A1* | 3/2017 | Kanai | H04N 1/00411 |
| 2018/0079118 A1* | 3/2018 | Nishiura | H04N 1/00411 |
| 2020/0241882 A1 | 7/2020 | Suzuki et al. | |

FOREIGN PATENT DOCUMENTS

| JP | 10-181162 | 7/1998 |
|---|---|---|
| JP | 2010-118763 | 5/2010 |
| JP | 2014-048826 | 3/2014 |

* cited by examiner

*Primary Examiner* — King Y Poon
*Assistant Examiner* — Michael Burleson
(74) *Attorney, Agent, or Firm* — Xsensus LLP (57) ABSTRACT

An image forming apparatus includes a printer engine configured to print a print image on a recording sheet based on image data, a post-processing device configured to perform post-processing on the recording sheet having the print image, and circuitry configured to perform following operation. The circuitry is configured to acquire print setting information; acquire information on a post-processing capability; generate a predicted image representing a state of the recording sheet applied with the post-processing, based on the image data, the print setting information, and the information on the post-processing capability; and display the predicted image.

8 Claims, 7 Drawing Sheets

IMAGE FORMING APPARATUS AND METHOD FOR DISPLAYING IMAGE

CROSS-REFERENCE TO RELATED APPLICATION

This patent application is based on and claims priority pursuant to 35 U.S.C. § 119(a) to Japanese Patent Application No. 2019-207233, filed on Nov. 15, 2019, in the Japan Patent Office, the entire disclosure of which is hereby incorporated by reference herein.

BACKGROUND

Technical Field

Embodiments of the present disclosure relate to an image forming apparatus and a method for displaying an image of a predicted output from an image forming apparatus.

Related Art

In image forming apparatuses having printing; facsimile transmission, and post-processing capabilities, there are apparatuses that display image data as a target of output (printing, facsimile transmission, or post-processing) before the outputting. The image data is displayed on an operation screen of the image forming apparatus; so that a user can visually recognize the form of output.

For example, a flat image that three-dimensionally illustrates the image forming apparatus and an arrow illustrating a sheet conveyance passage in the image forming apparatus are displayed on a display of a personal computer (PC), so that the user can visually recognize the sheet conveyance passage in the printing before the printing.

SUMMARY

According to an embodiment of this disclosure, an image forming apparatus includes a printer engine configured to print a print image on a recording sheet based on image data, a post-processing device configured to perform post-processing on the recording sheet having the print image, and circuitry configured to perform following operation. The circuitry is configured to acquire print setting information according to which printing and post-processing are performed; acquire information on a post-processing capability; generate a predicted image representing a state of the recording sheet applied with the post-processing, based on the image data, the print setting information, and the information on the post-processing capability; and display the predicted image.

Another embodiment of this disclosure provides a method for displaying an image of a predicted output from an image forming apparatus. The method includes acquiring print setting information according to which printing based on image data and post-processing are performed on recording sheet, acquiring information on a post-processing capability, generating a predicted image representing a state of the recording sheet after the post-processing, and displaying the predicted image. The circuitry generates the predicted image based on the image data, the print setting information, and the information on the post-processing capability.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

In the embodiment described below, an image forming apparatus displays a state of a recording medium after post-processing, and the state is obtained based on image data, print setting for printing on a recording medium based on image data, and information of capability to perform post-processing on the printed recording medium. Thus, a user of the image forming apparatus can visually recognize the state of the recording medium after output before the output, even when the post-processing capability reaches the limit.

In the following, an embodiment will be described by taking an image forming apparatus such as a multifunction peripheral (MFP) that performs electrophotographic printing on a sheet of recording media. In addition, the terms "image formation" and "print" in the embodiments are synonymous.

First Embodiment

Hardware Configuration of Image Forming Apparatus

Figure 1:
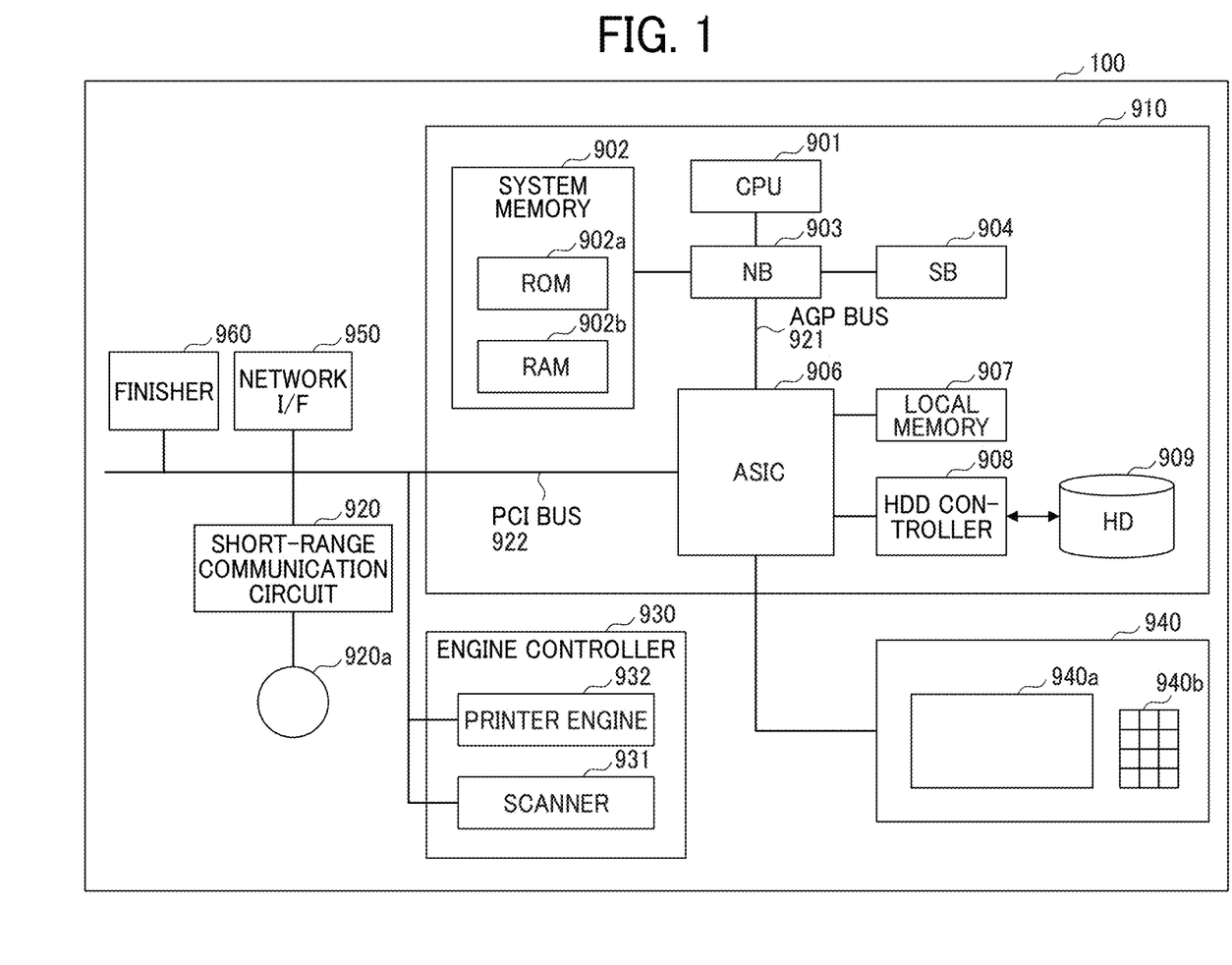
FIG. 1 is a block diagram illustrating a hardware configuration of an image forming apparatus according to an embodiment of the present disclosure.

A description is given of a hardware configuration of an image forming apparatus 100 according to a first embodiment. FIG. 1 is a block diagram illustrating an example of the hardware configuration of the image forming apparatus 100.

As illustrated in FIG. 1, the image forming apparatus 100 includes a controller 910, a short-range communication circuit 920, an engine controller 930, a control panel 940, a network interface (I/F) 950, and a finisher 960.

The controller 910 includes a central processing unit (CPU) 901 as a main processor, a system memory 902 (MEM-P), a north bridge (NB) 903, and a south bridge (SB) 904. The controller 910 further includes an application specific integrated circuit (ASIC) 906, a local memory 907 (MEM-C) as a storage, a hard disk drive (HDD) controller 908, and a hard disk (HD) 909 as a storage. The NB 903 and the ASIC 906 are connected by an Accelerated Graphics Port (AGP) bus 921.

The CPU 901 is a control unit that controls the entire image forming apparatus 100. The NB 903 connects the CPU 901, with the system memory 902, the SB 904, and the AGP bus 921. The NB 903 includes a memory controller to control reading and writing of various data from and in the system memory 902, a peripheral component interconnect (PCI) master, and an AGP target.

The system memory 902 includes a read only memory (ROM) 902a and a random access memory (RAM) 902b. The ROM 902a stores data and program for implementing various functions of the controller 910. The RAM 902b is used for loading the program and the data and is also used as a drawing memory to store drawing data for printing.

The program stored in the RAM 902b can be stored in any computer-readable recording medium, such as a compact disc read only memory (CD-ROM), a compact disc-recordable (CD-R), or a digital versatile disk (DVD), in a file format installable and executable by the computer, for distribution.

The SB 904 connects the NB 903 to a PCI device and a peripheral device. The ASIC 906 is an integrated circuit (IC) dedicated to an image processing use and has hardware elements for image processing. The ASIC 906 serves as bridges connecting the AGP bus 921, a PCI bus 922, the HDD 908, and the local memory 907.

The ASIC 906 includes a PCI target, an AGP master, an arbiter (ARB) that is a core of the ASIC 906, a memory controller that controls the local memory 907, and a plurality of direct memory access controllers (DMACs) that rotate image data with hardware logic, and a PCI unit that performs data transfer between a scanner 931 and a printer engine 932 via the PCI bus 922.

The ASIC 906 can be connected to a universal serial bus (USB) interface, or the Institute of Electrical and Electronics Engineers 1394 (IEEE 1394) interface.

The local memory 907 is a local memory used as a buffer for image data to be copied or coding. The FED 909 is a storage for storing image data, font data used in printing, and form data.

The HDD 908 controls the reading or writing of data from or into the HD 909 under the control of the CPU 901. The AGP bus 921 is a bus interface for a graphics accelerator card, which is proposed to accelerate graphics processing.

The AGP bus 921 directly accesses the system memory 902 with high throughput to accelerate the graphics accelerator card.

The short-range communication circuit 920 includes a short-range communication antenna 920a. The short-range communication circuit 920 communicates in compliance with near field communication (NFC), Bluetooth (registered trademark), or the like.

Further, the engine controller 930 includes the scanner 931 and the printer engine 932. The scanner 931 includes an optical system including a light source and reflection mirrors. The printer engine 932 is an electrophotographic image forming mechanism including, for example, a photoconductor, a developing device, and the like. Further, the control panel 940 displays the current set value, a selection screen, and the like. The control panel 940 includes a panel display unit 940a such as a touch panel that accepts an input from an operator, a numeric keypad that accepts a set value of a print setting such as a density setting, and an operation panel 940b that includes a start key that accepts a copy start instruction.

The controller 910 controls the entire image forming apparatus 100, and controls drawing, communication, and input from the control panel 940. The scanner 931 or the printer engine 932 includes an image processing unit for, for example, error diffusion and gamma conversion.

With an application switching key on the control panel 940, the operator can sequentially switch the function of the image forming apparatus 100 among a document server function, a copy function, a print function, and a facsimile function. When the document server function is selected, the image forming apparatus 100 enters a document server mode. When the copier function is selected, the image forming apparatus 100 enters a copier mode. When the print function is selected, the apparatus enters a print mode, and, when the facsimile function is selected, the apparatus enters a facsimile mode.

The network I/F 950 is an interface for data communication using a network. The short-range communication circuit 920 and the network I/F 950 are electrically connected to the ASIC 906 via the PCI bus 922.

The finisher 960 (a post-processing device) performs post-processing such as stapling, punching, and collating of the sheet on which the printer engine 932 has performed printing. For example, the finisher 960 includes a tray, a stacker to stack a bundle of sheets on the tray, a fence to align the sheets on the tray, stapler, a punch, and folding roller.

Figure 2:
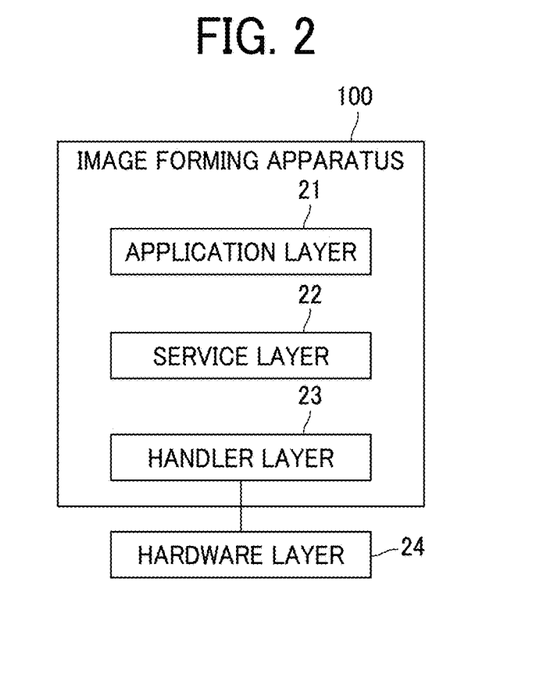
FIG. 2 is a block diagram illustrating an example of a software configuration of the image forming apparatus illustrated in FIG. 1.

Referring now to FIG. 2, a description is given of a software configuration of the image forming apparatus 100. FIG. 2 is a block diagram illustrating an example of the software configuration of the image forming apparatus 100.

As illustrated in FIG. 2, the image forming apparatus 100 includes an application layer 21, a service layer 22, and a handler layer 23.

The substance of the application layer 21, the service layer 22, and the handler layer 23 is various software stored in the ROM 902a, the local memory 907, or the like. The CPU 901 executes such software to implement various functions.

The hardware layer 24 represents hardware resources of the image forming apparatus 100. The service layer 22, the handler layer 23, and the hardware layer 24 are collectively referred to as a platform.

The software of the application layer 21 is application software for operating hardware resources belonging to the hardware layer 24, thereby implementing a predetermined function (in the following description, "application software" may be simply referred to as "application"). In response to reception of an instruction or a setting request via the control panel 940, the application sends a request to the platform to implement a function of the application.

Examples of the application include a copy application for copying, scanner application for scanning, facsimile application for facsimile communication, and print application for printing.

The software of the service layer 22 is interposed between the application layer 21 and the handler layer 23, and implements the application with an interface for using the hardware resources of the image forming apparatus 100.

More specifically, the software implements the functions such as receiving the operation requests to the hardware resources and mediating the operation requests. Examples of operation requests accepted by the service layer 22 include requests for reading by the scanner 931 and printing by the printer engine 932. The interface function of the service layer 22 is implemented by an application programming interface (API) or the like.

The software of the handler layer 23 is basic software for implementing a basic function to control the hardware of the image forming apparatus 100. The software of the service layer 22 converts a request of use of the hardware resource from various applications to a command interpretable by the handler layer 23, and forwards the request to the handler layer 23. As the software of the handler layer 23 executes the command, the hardware resource operates in accordance with the request from the application.

The operations executed by the software of the handler layer 23 include control of data storing and/or data retrieval of the system memory 902, control of data storing and/or data retrieval of the local memory 907, control of the scanner 931, and control of the printer engine 932.

Figure 3:
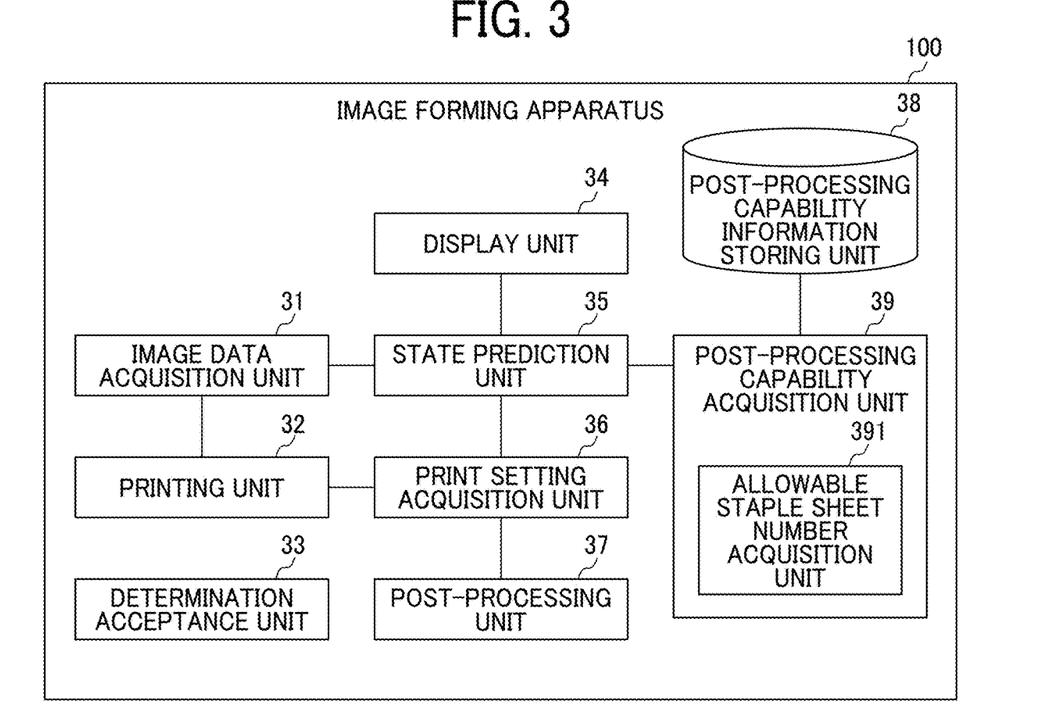
FIG. 3 is a block diagram illustrating a functional configuration of the image forming apparatus illustrated in FIG. 1.

A description is given of a functional configuration of the image forming apparatus 100. FIG. 3 is a block diagram illustrating an example of the functional configuration of the image forming apparatus 100.

As illustrated in FIG. 3, the image forming apparatus 100 includes an image data acquisition unit 31, a printing unit 32, a determination acceptance unit 33, a display unit 34, a state prediction unit 35, a print setting acquisition unit 36, a post-processing unit 37, a post-processing capability information storing unit 38, and a post-processing capability acquisition unit 39. The post-processing capability acquisition unit 39 includes an allowable staple sheet number acquisition unit 391.

Referring also to FIG. 1, the image data acquisition unit 31 is implemented by the scanner 931 and the like, the printing unit 32 is implemented by the printer engine 932 and the like, the function of the post-processing unit 37 is implemented by the finisher 960 and the like, and the post-processing capability information storing unit 38 is implemented by the ROM 902a, the local memory 907, and the like.

Further, the display unit 34 and the determination acceptance unit 33 are implemented by the control panel 940 and the like. The print setting acquisition unit 36, the post-processing capability acquisition unit 39, the allowable staple sheet number acquisition unit 391, and the state prediction unit 35 are implemented as the CPU 901 executes a predetermined program.

The image data acquisition unit 31 acquires image data (electronic data) of print target and outputs the acquired image data to the printing unit 32 and the state prediction unit 35. The document to be read by the scanner 931 is manually placed on an exposure glass of the image forming apparatus 100. Alternatively, an automatic document feeder (ADF) automatically places the document to be read thereon.

The image data acquisition unit 31 acquires an electronic file of image data from an external device such as a personal computer (PC) via the network OF 950. The image data acquisition unit 31 can acquire image data from an external device such as a digital camera or a USB memory via, for example, a USB interface.

The print setting acquisition unit 36 acquires the print setting information input by the user via the control panel 940, and outputs the acquired information to the print unit 32, the state prediction unit 35, and the post-processing unit 37. Here, the print setting includes setting of post-processing. The print setting acquisition unit 36 can acquire the print setting information by reading a setting file that is preliminarily set and stored, for example, in the local memory 907 by the user.

The print setting information includes the number of sheets to be printed (the number of pages); the orientation of the sheet with respect to the conveyance direction such as vertical and horizontal; the printing color such as color and monochrome; page combine setting, such as, combining two pages into one page and combining four pages into one page; image forming sides such as single-sided and double-sided; and post-processing types such as stapling, punching, and collating.

More specifically, for example, in a case of copying, the print setting information corresponds to "color setting," "document/copy sheet size," "finishing setting," "editing setting," "combining setting," "reduce/enlarge setting," and etc.

The printing unit 32 performs printing on a sheet based on the image data input from the image data acquisition unit 31 and according to the print setting information input from the print setting acquisition unit 36.

The post-processing unit 37 performs post-processing of the sheet on which the printing unit 32 has performed printing, according to the instruction on the post-processing type included in the print setting information input from the print setting acquisition unit 36.

The post-processing capability information storing unit 38 stores information on the capability of post-processing performed by the finisher 960 in association with the type of the finisher 960. An example of the post-processing capability information is information about the maximum number of sheets (recording sheet number) that the finisher 960 can staple.

In the stapling process (binding process), after staples are pushed into a plurality of sheets, the staples are bent to bind the plurality of sheets. However, when the number of sheets exceeds the upper limit of stapling, the staple penetrating the sheets cannot be bent. Thus, stapling is not feasible. The term "upper limit of allowable number of sheets for stapling" signifies the maximum number of sheets that can be stapled.

The post-processing capability acquisition unit 39 acquires post-processing capability information and outputs the acquired information to the state prediction unit 35. Further, the allowable staple sheet number acquisition unit 391 refers to the post-processing capability information storing unit 38 based on the type of the finisher 960, to acquire the information of upper limit number of sheets to be stapled.

The state prediction unit 35 predicts the state of the sheets after post-processing, based on the image data input from the image data acquisition unit 31, the print setting information input from the print setting acquisition unit 36, and the post-processing capability information input from the post-processing capability acquisition unit 39. Then, the state prediction unit 35 outputs the predicted result to the display unit 34.

The prediction result includes an image representing the output state of printed sheets, a state image representing the state of the post-processed sheets, notification information indicating that, for example, the instructed operation exceeds the limit of the post-processing capability. The predicted state image (predicted image) representing the state of the post-processed sheet includes a flat image that three-dimensionally represents the post-processed sheet, generated by the state prediction unit 35.

The display unit 34 displays the prediction result input from the state prediction unit 35 on the control panel 940 or the like. The display unit 34 can also display the prediction result on a monitor or the like of an external device such as a PC via the interface.

The user visually recognizes the predicted state of the post-processed sheet displayed on the display unit 34 and can determine whether to perform printing and post-processing, whether there is a problem with the image data to be printed, and there is a problem with the print settings.

The determination acceptance unit 33 accepts the result of such a determination by the user. In accordance with such a determination result, printing, post-processing, change of image data, change of print settings, etc. are performed.

Example of Prediction Result

Next, a description is given of the result of prediction of the state of the post-processed sheet by the state prediction unit 35 and displayed by the display unit 34.

Figure 4A:
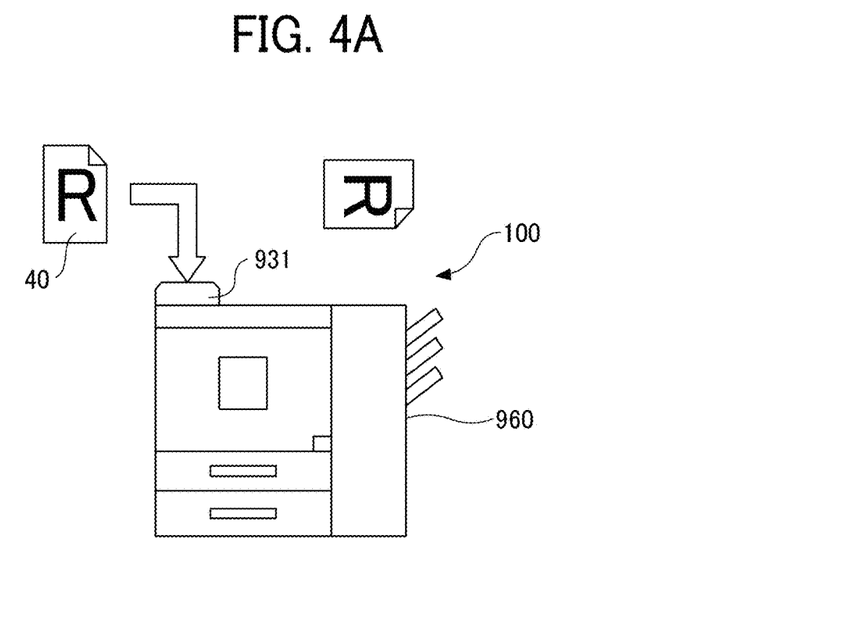
FIG. 4A is a front view of the image forming apparatus illustrated in FIG. 1 and illustrates a sheet state therein.
Figure 4B:
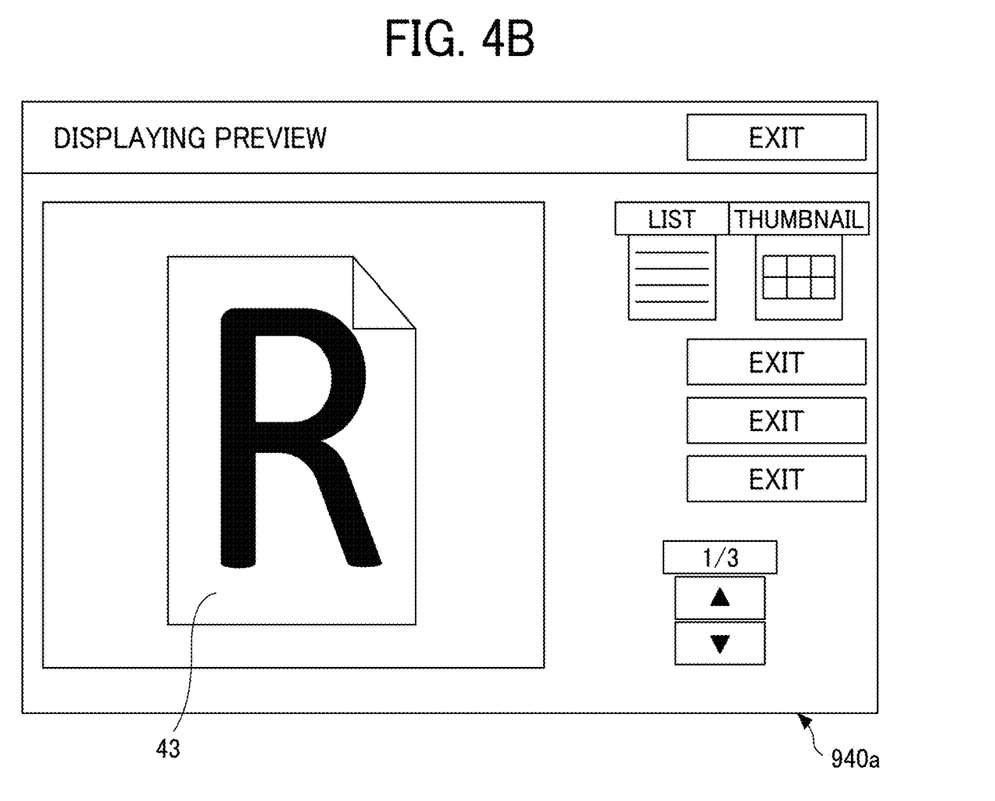
FIG. 4B illustrates an example of a display screen in the state illustrated in FIG. 4A.

FIG. 4A and FIG. 4B are diagrams of an example of a screen of the image forming apparatus 100 displaying the sheet state. FIG. 4A is a front view of the image forming apparatus 100, and FIG. 4B illustrates the display screen.

As illustrated in FIG. 4A, the scanner 931 reads a document 40 placed on the exposure glass of the image forming apparatus 100, and the image data acquisition unit 31 acquires the data of the image read by the scanner 931.

The state prediction unit 35 predicts the sheet state after printing based on the image data input from the image data acquisition unit 31 and the print setting information input from the print setting acquisition unit 36. The state prediction unit 35 outputs the prediction result to the display unit 34.

As illustrated in FIG. 4B, according to the prediction result, the display unit 34 displays an output image 43 presenting the sheet state after printing on the panel display unit 940a of the control panel 940.

In the examples illustrated in FIGS. 4A and 4B, the post-processing is not instructed, and the output image 43 is displayed in the state without the post-processing.

In a case where the instructed post-processing operation exceeds the limit of the post-processing capability, the state prediction unit 35 outputs, to the display unit 34, the prediction result including the notification of exceeding of the limit. The display unit 34 displays such a notification as an example of a predetermined notification.

Figure 5:
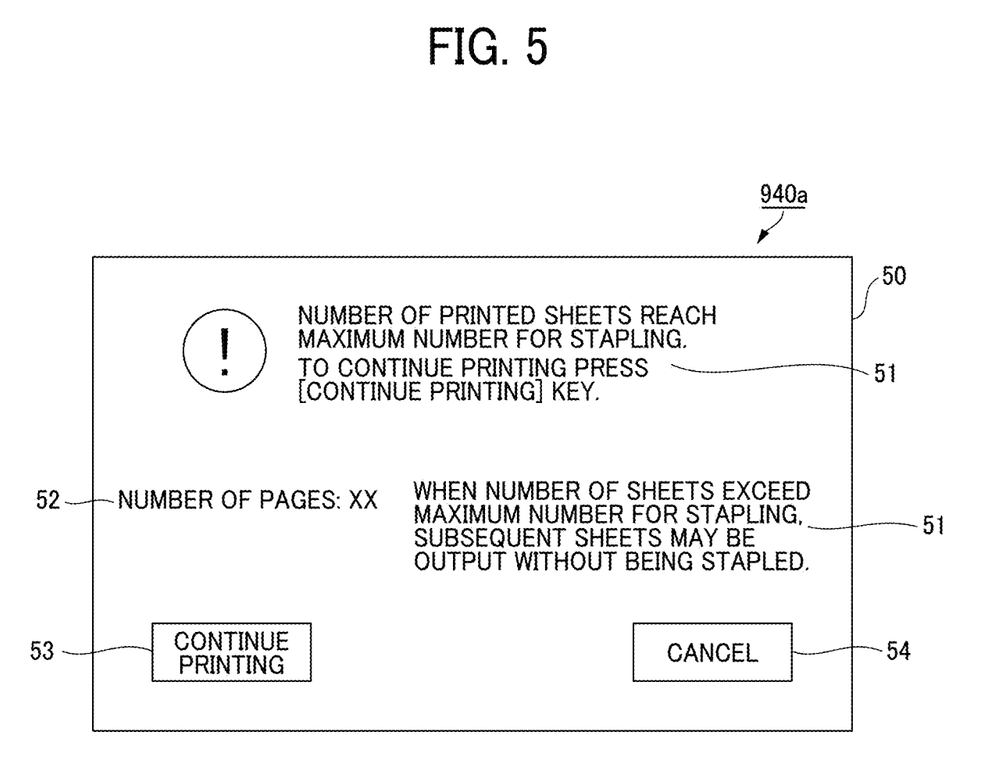
FIG. 5 illustrates an example of a notification on a display screen of the image forming apparatus illustrated in FIG. 1.

FIG. 5 is a diagram illustrating an example of a notification display screen by the display unit 34, and illustrates a dialog box 50 on the panel display unit 940a.

In the example illustrated in FIG. 5, stapling is instructed to be executed as the post-process. In this example, the dialog box 50 displays a notification 51 indicating that the number of printed sheets reaches the upper limit of the allowable number of sheets for stapling, a page number (sheet number) 52 allowable for stapling, a continue printing key 53, and a cancel key 54 for stopping printing. Viewing the dialog box 50, the user can determine whether or not to continue printing and touch either the continue printing key 53 or the cancel key 54 depending on the determination.

In response to touching of the continue printing key 53 by the user responding to the notification illustrated in FIG. 5, the display unit 34 displays the sheet state after stapling, included in the prediction result input from the state prediction unit 35.

Figure 6A:
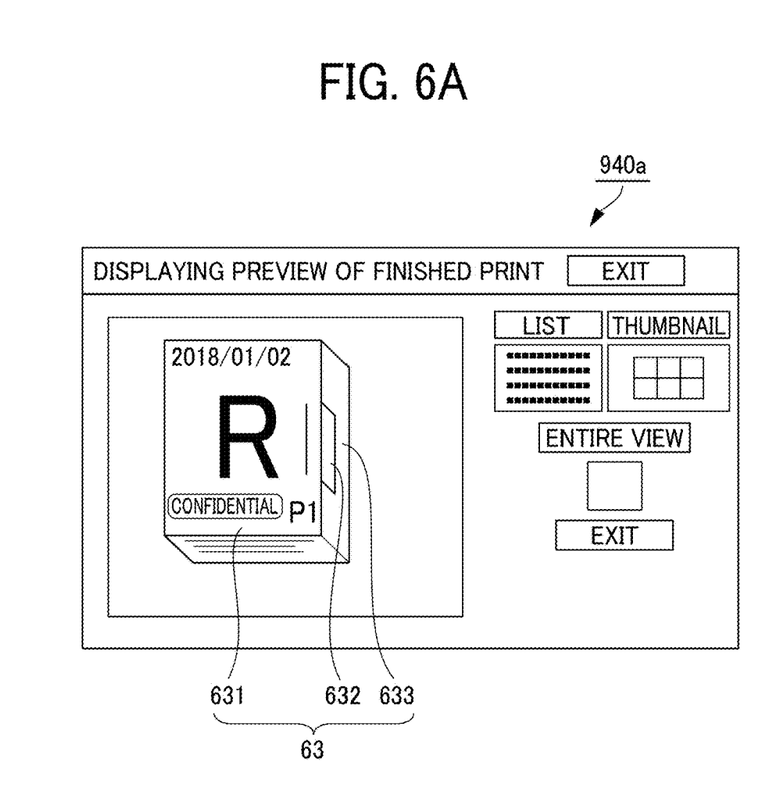
FIG. 6A illustrates another example of the display screen of the image forming apparatus illustrated in FIG. 1 and presents a bundle of printed sheets partly stapled, as a sheet state after stapling.
Figure 6B:
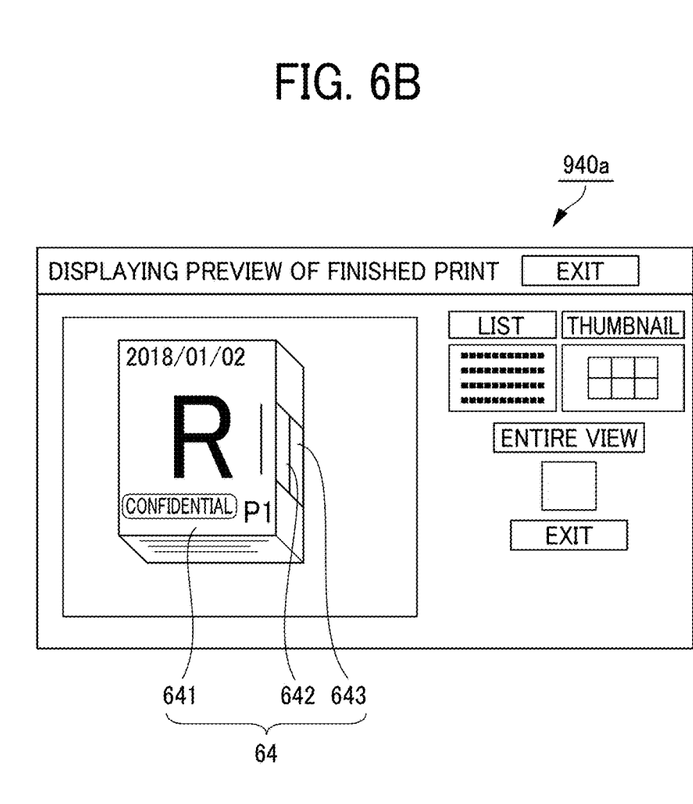
FIG. 6B illustrates another example of the sheet state after stapling on the display screen illustrated in FIG. 6A, in which printed sheets are divided into a plurality of bundles and stapled.

FIGS. 6A and 6B illustrate examples of the display screen of the sheet state after such a stapling. FIG. 6A is a diagram illustrating a state in which a portion of a bundle of printed sheets is stapled. FIG. 6B is a diagram illustrating a state in which printed sheets are divided into a plurality of stapled bundles of sheets.

FIG. 6A illustrates a predicted state image 63 which is a flat image that three-dimensionally represents the sheet after stapling. The predicted state image 63 is an image including a print image 631 to be printed, a stapled sheet bundle 632 of the printed sheets, and a sheet bundle 633 not stapled. The state represented by the predicted state image 63 corresponds to "state of the recording media stapled" and "state of the recording medium not stapled."

FIG. 69 also illustrates a predicted state image 64 which is a flat image that three-dimensionally represents the sheet after stapling. The predicted state image 64 includes a print image 641 to be printed, a stapled sheet bundle 642 of the printed sheets, and another stapled sheet bundle 643 that is the rest of printed sheets. In other words, the plurality of sheets are divided into two bundles, and each of the two divided bundles is stapled. The state represented by the predicted state image 64 corresponds to "state in which a plurality of recording media is divided into a plurality of bundles and stapled."

In this way, the state of the sheets after stapling reflecting the stapling capability can be displayed.

Figure 7:
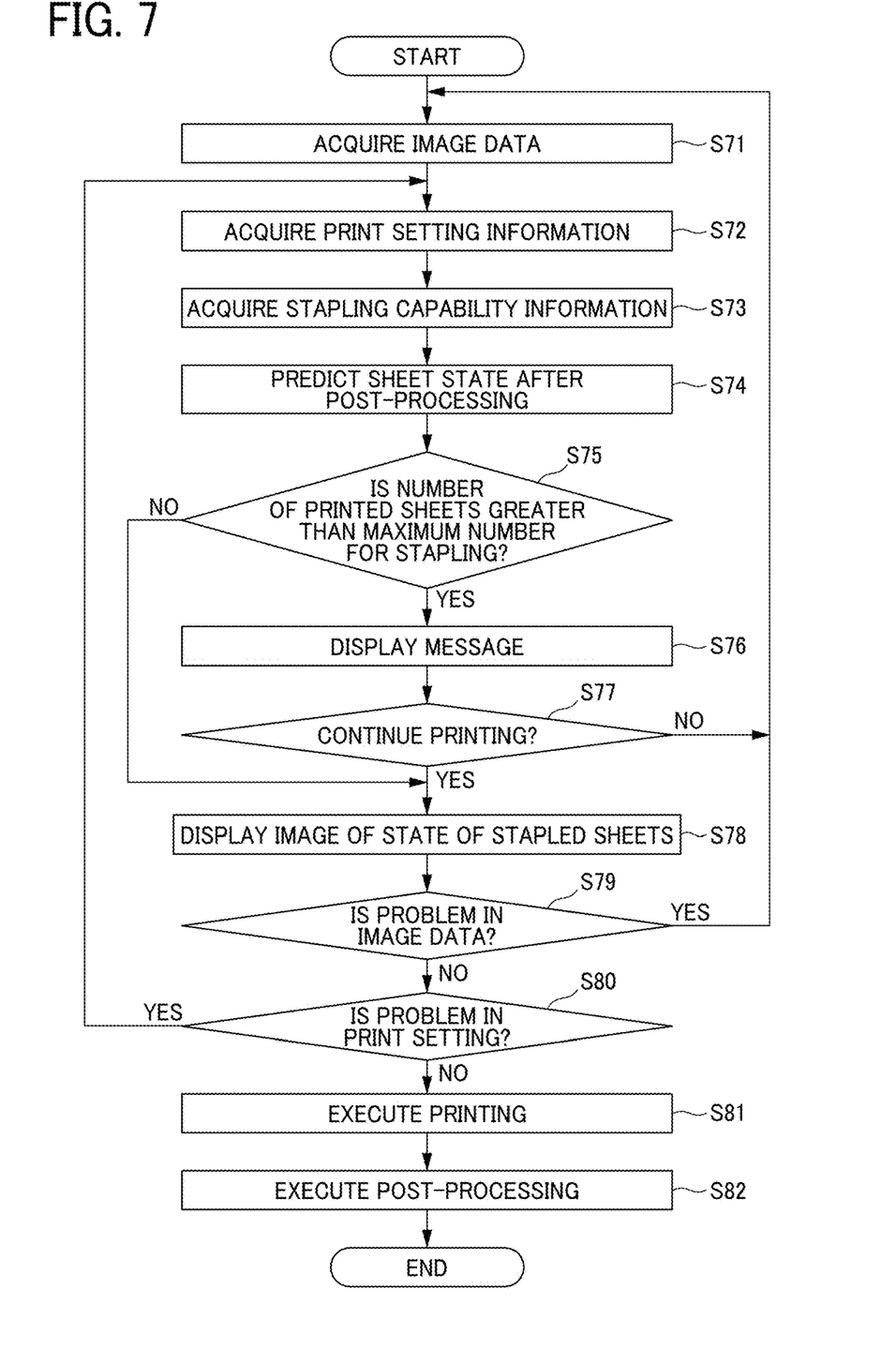
FIG. 7 is a flowchart of an operation example of the image forming apparatus illustrated in FIG. 1.

A description is given below of an operation of the image forming apparatus 100. FIG. 7 is a flowchart illustrating an example of the operation of the image forming apparatus 100.

In S71, the image data acquisition unit 31 acquires the image data to be printed, and outputs the acquired image data to the printing unit 32 and the state prediction unit 35.

In S72, the print setting acquisition unit 36 acquires the print setting information input by the user via the control panel 940, and outputs the acquired information to the printing unit 32, the post-processing unit 37, and the state prediction unit 35.

In S73, the allowable staple sheet number acquisition unit 391 of the post-processing capability acquisition unit 39 refers to the post-processing capability information storing unit 38 based on the type of the finisher 960, and acquires the upper limit of number of sheets for stapling (stapling capability information). Then, the acquired information is output to the state prediction unit 35.

Note that the order of the processes of S72 and S73 may be changed as appropriate, or both may be executed in parallel.

In S74, the state prediction unit 35 predicts a sheet state after stapling based on the image data input from the image data acquisition unit 31, the print setting information input from the print setting acquisition unit 36, and stapling capability information input from the post-processing capability acquisition unit 39.

In S75, the state prediction unit 35 determines whether the number of printed sheets is greater than the maximum number of sheets for stapling.

In response to a determination in S75 that the number of printed sheets is greater than the maximum number of sheets for stapling (Yes in S75), the state prediction unit 35 outputs, to the display unit 34, information that the number is greater and data of a flat image that three-dimensionally represents the sheets after stapling.

In a S76, the display unit 34 displays a massage (notification) that the number of printed sheets is greater than the maximum number of sheets for stapling.

In S77, the determination acceptance unit 33 accepts the determination result of whether or not to continue printing by the user who has viewed the message.

In response to a determination to continue printing (Yes in S77), the process proceeds to S78. On the other hand, in response to a determination not to continue the printing (No in S77), the process returns to S71, and the processes after S71 are performed again.

By contrast, in response to a determination in S75 that the number of printed sheets is not greater than the maximum number of sheets for stapling (S75, No), the state prediction unit 35 outputs, to the display unit 34, data of a flat image that three-dimensionally represents of the sheets after stapling. Then, the process proceeds to S78.

In S78, the display unit 34 displays a flat image that three-dimensionally represents the sheets after the stapling.

Subsequently, in S79, the determination acceptance unit 33 accepts the determination of whether or not the image data has a problem by the user who has viewed the predicted state image of the sheets after the stapling.

In response to a determination in S79 that there is a problem (S79, Yes), the process returns to S71. Then, the processes after S71 are performed again. On the other hand, in response to a determination that there is no problem (S79, No), the process proceeds to S80.

Subsequently, in S80, the determination acceptance unit 33 accepts a determination of whether there is a problem in the prim and post-processing settings by the user who has viewed the predicted state image of the sheets after stapling.

When the determination in S80 is that there is a problem (S80, Yes), the process returns to S72, and the processes after S72 are performed again. On the other hand, in response to a determination that there is no problem (S80, No), the process proceeds to S81.

The order of the processes of steps S79 and S80 can be changed. Alternatively, the determination acceptance unit 33 can accept the determination results in S79 and S80 in parallel, and execute both processes in parallel.

Subsequently, in S81, the printing unit 32 performs printing on the sheets based on the image data input from the image data acquisition unit 31 and according to the print setting information input from the print setting acquisition unit 36.

Subsequently, in S82, the post-processing unit 37 performs stapling on the sheets on which the printing unit 32 has performed printing according to the print setting information input from the print setting acquisition unit 36.

In this way, the image forming apparatus 100 can execute printing and stapling.

As described above, the image forming apparatuses according to the above-described embodiment acquires and displays a state of the sheets after post-processing based on image data, print (and post-processing) setting for the sheets based on the image data, and information of capability to perform post-processing on the printed sheets, More specifically, when the number of printed sheets exceeds the upper limit of the number of sheets allowed for stapling, the image forming apparatuses displays a notification thereof and the state of sheets when the allowable number of sheets are stapling. This allows the user to visually recognize the state of the sheets after the post-processing that is more realistic. In other words, even when the number of sheets exceeds the post-processing capability, the image forming apparatus can enable the user to visually recognize the output state of sheets in a realistic manner before the output.

In the present embodiment, the stapling is exemplified as the post-processing, but the present disclosure is not limited thereto. Aspects of the present disclosure can be applied to other post-processing such as punching and collating.

Further, in the embodiment described above, the number of sheets for which the stapling is permitted is exemplified as the post-processing capability, but post-processing capability is not limited thereto. Aspects of the present disclosure can be applied to other post-processing capability such as the allowable number of sheets for punching and the number of staples accommodated by the finisher 960.

Further, although the electrophotographic image forming apparatus is exemplified in the embodiment described above, aspects of the present disclosure are also applicable to a liquid discharge apparatus that discharges liquid such as ink.

Figure 8:
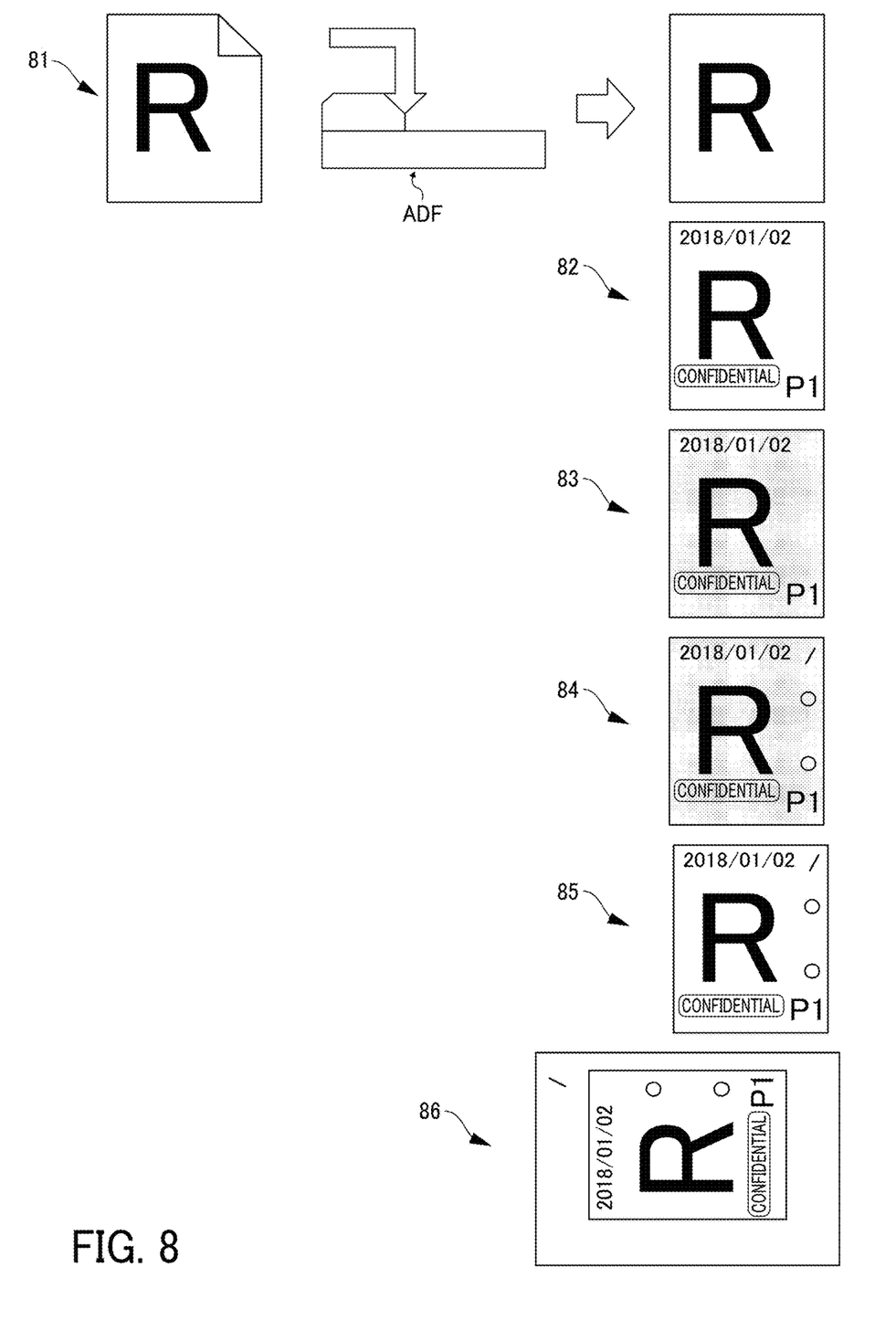
FIG. 8 is a diagram illustrating various states of the sheets after printing or post-processing according to an embodiment.

A description is given of another embodiment of the present disclosure, with reference to FIG. 8. FIG. 8 illustrates various states of sheets after printing or post-processing, displayed by the image forming apparatus 100.

A predicted state image 81 represents a state of a sheet output after an image formation is performed according to reading by the scanner 931, and represents the sheet including the print image.

A predicted state image 82 represents a state of a sheet output according to print settings in which a date, a page, and a stamp are added to the print image. The predicted state image 82 represents a sheet on which the print image, the date, and the page, and a stamp indicating confidential information are printed.

A predicted state image 83 represents a state of a sheet output according to print settings of full color and dark print density. The predicted state image 83 is an image of the sheet on which printing is performed in full color and dark print density.

A predicted state image 84 represents a state of a sheet output according to print settings instructing post-processing of two-hole punching and stapling. The predicted state image 84 is an image of the sheet applied with two-hope punching and stapling.

A predicted state image 85 represents a state of a sheet output according to print settings including specifications of the image forming apparatus 100. The predicted state image 85 is an image of the sheet after printing that reflects the specifications of toner (e.g., No. 123) and a photoconductor (1200 rotations).

A predicted state image 86 represents a state of a sheet output according to print settings instructing post-processing of two-hole punching and stapling and sheet orientation of landscape. The predicted state image 86 is an image of the landscape sheet applied with two-hope punching and stapling. Sheet feeding is adjusted to the specifications of the finisher 960 (i.e., an optional device), and an A3 sheet in the orientation of landscape is set.

In this way, the image forming apparatus can provide the user with a view of the sheet state after output reflecting various print settings including the post-processing setting.

The image forming apparatus and method of providing a preview of output state of a sheet printed or processed according to the embodiments and the variation described above are illustrative and do not limit the present disclosure. Thus, numerous additional modifications and variations are possible in light of the above teachings. For example, elements and/or features of different illustrative embodiments may be combined with each other and/or substituted for each other within the scope of the present invention Any one of the above-described operations may be performed in various other ways, for example, in an order different from the one described above.

Further, as aspect of the present disclosure is the following image forming method. For example, the image forming method includes performing printing on a recording medium based on image data, performing post-processing on the recording medium after printing, acquiring print sating information, acquiring post-processing capability information, and displaying a state of the recording medium after the post-processing based on the image data, the print setting information, and the post-processing capability information. Such an image forming method can provide the same effects as those of the image forming apparatus described above. The image forming method can be implemented by a circuit, such as, a CPU and a large scale integration (LSI), an IC card, or a single module.

Further, embodiments of the present disclosure includes program codes which, when executed by one or more processors, causes the processors (computer) to perform, for example, the method including performing printing on a recording medium based on image data, performing post-processing on the recording medium after printing, acquiring print setting information, acquiring post-processing capability information, and displaying a state of the recording medium after the post-processing based on the image data, the print setting information, and the post-processing capability information. Such program codes can provide the same effects as those of the image forming apparatus described above.

Further, each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules designed to perform the recited functions.

What is claimed is:

1. An image forming apparatus comprising:
a printer engine configured to print a print image on a recording sheet based on image data;
a post-processing device configured to perform post-processing on the recording sheet having the print image; and
circuitry configured to:
acquire print setting information according to which printing and post-processing are performed;
acquire information on a post-processing capability;
generate a predicted image representing a state of the recording sheet applied with the post-processing, based on the image data, the print setting information, and the information on the post-processing capability; and
display the predicted image,
wherein the post-processing is stapling of a plurality of recording sheets after printing, and
wherein the circuitry is configured to, in response to a determination that a number of the plurality of recording sheets is greater than an upper limit of a recording sheet number for stapling, display, the predicted image which represents a state in which the plurality of recording sheets is divided into a plurality of stapled bundles.

2. The image forming apparatus according to claim 1, wherein the information on the post-processing capability includes an upper limit number of recording sheets to be stapled.

3. The image forming apparatus according to claim 1, wherein the circuitry is configured to display, as the predicted image, a flat image that three-dimensionally represents the recording sheet applied with the post-processing.

4. The image forming apparatus according to claim 1, wherein the circuitry is configured to, in response to a determination that a required capability for applying the post-processing according to the print setting information exceeds the post-processing capability, display a notification.

5. The image forming apparatus according to claim 1, wherein the circuitry is configured to, in response to a determination that a required capability for applying the post-processing according to the print setting information exceeds the post-processing capability, display a predicted image representing a state in which the post-processing is performed on a portion of recording sheets and the post-processing is not performed on a rest of the recording sheets.

6. The image forming apparatus according to claim 5, wherein the post-processing is stapling of a plurality of recording sheets after printing, and
wherein the circuitry is configured to, in response to a determination that a number of the plurality of recording sheets is greater than an upper limit of a recording sheet number for stapling, display a predicted image representing a state in which a portion of the plurality of recording sheets is stapled and a rest of the plurality of recording sheets is not stapled.

7. A method for displaying an image of a predicted output from an image forming apparatus, the method comprising:
acquiring print setting information according to which printing based on image data and post-processing are performed on a recording sheet;
acquiring information on a post-processing capability;
generating a predicted image representing a state of the recording sheet applied with the post-processing, based on the image data, the print setting information, and the information on the post-processing capability;
determining that a required capability for applying the post-processing according to the print setting information exceeds the post-processing capability; and
displaying, when the determining determines that the required capability for applying the post-processing according to the print setting information exceeds the post-processing capability, the predicted image which represents a state in which the post-processing is performed on a portion of recording sheets and the post-processing is not performed on a rest of the recording sheets.

8. A non-transitory recording medium storing a plurality of program codes which, when executed by one or more processors, causes the processors to perform a method, the method comprising:

acquiring print setting information according to which printing based on image data and post-processing are performed on a recording sheet, the post-processing including a stapling of a plurality of recording sheets after printing;

acquiring information on a post-processing capability;

generating a predicted image representing a state of the recording sheet applied with the post-processing, based on the image data, the print setting information, and the information on the post-processing capability;

determining that a number of the recording sheets is greater than an upper limit of a recording sheet number for stapling; and displaying, in response to the determining that a number of the plurality of recording sheets is greater than an upper limit of a recording sheet number for stapling, the predicted image which represents a state in which the plurality of recording sheets is divided into a plurality of stapled bundles.

\* \* \* \* \*